(12) United States Patent
Rosborough et al.

(10) Patent No.: US 7,479,097 B2
(45) Date of Patent: Jan. 20, 2009

(54) SAFETY BALANCE DEVICE (75) Inventors: Robert B. Rosborough, Mahwah, NJ (US); Carolyn Perrier, Newport Beach, CA (US)

(73) Assignee: Pivit, LLC, Franklin Lakes, NJ (US)

( * ) Notice: Subject to any disclaimer, the term of this patent is extended or adjusted under 35 U.S.C. 154(b) by 583 days.

(21) Appl. No.: 10/462,016

(22) Filed: Jun. 13, 2003

(65) Prior Publication Data
US 2005/0101441 A1    May 12, 2005

Related U.S. Application Data (60) Provisional application No. 60/388,675, filed on Jun. 13, 2002.

(51) Int. Cl.
A63B 22/14    (2006.01)
A63B 22/16    (2006.01)

(52) U.S. Cl. .................................... 482/146; 446/396

(58) Field of Classification Search ................ 446/396; D21/688, 689; 482/68, 71, 66, 147, 34, 146, 482/79–80; 280/87.041–2; 434/247, 253, 434/365
See application file for complete search history.

(56) References Cited

U.S. PATENT DOCUMENTS

| | | | | |
|---|---|---|---|---|
| 2,764,411 A * | 9/1956 | Washburn, Jr. | ............... | 482/146 |
| 2,829,892 A * | 4/1958 | Ludwig | ....................... | 482/146 |
| 3,188,087 A * | 6/1965 | Larson, Jr. | ................... | 273/115 |
| 3,630,540 A | 12/1971 | Smith | | |
| 4,403,785 A * | 9/1983 | Hottel | ..................... | 280/14.23 |
| 4,505,477 A * | 3/1985 | Wilkinson | ................... | 482/146 |
| 4,601,469 A * | 7/1986 | Sasser, Jr. | .................... | 482/146 |
| 4,714,244 A * | 12/1987 | Kolomayets et al. | .......... | 482/72 |
| 4,796,881 A * | 1/1989 | Watterson | ..................... | 482/73 |
| 4,826,159 A * | 5/1989 | Hersey | ....................... | 482/146 |
| 4,911,440 A * | 3/1990 | Hyman et al. | ................ | 482/146 |
| 5,152,691 A * | 10/1992 | Moscarello | ................. | 434/247 |
| 5,190,506 A * | 3/1993 | Zubik et al. | ................. | 482/683 |
| 5,441,473 A * | 8/1995 | Safani et al. | ................ | 482/130 |
| 5,545,115 A * | 8/1996 | Corcoran | .................... | 482/146 |
| 5,813,864 A | 9/1998 | Ikuta | | |
| 5,833,252 A | 11/1998 | Strand | | |
| 5,833,582 A * | 11/1998 | Chen | ........................... | 482/57 |
| 5,851,331 A * | 12/1998 | Grenetier et al. | ............ | 156/235 |
| 5,864,333 A * | 1/1999 | O'Heir | ....................... | 345/157 |
| 5,891,002 A * | 4/1999 | Maki | ........................... | 482/79 |
| 6,017,297 A * | 1/2000 | Collins | ....................... | 482/146 |
| 6,080,090 A * | 6/2000 | Taylor et al. | ................ | 482/121 |
| 2003/0073541 A1* | 4/2003 | Carlson | ......................... | 482/1 |
| 2005/0075182 A1* | 4/2005 | Middleton | .................. | 472/135 |

* cited by examiner

*Primary Examiner*—Lori Amerson
(74) *Attorney, Agent, or Firm*—Christie, Parker & Hale, LLP (57) ABSTRACT

A balance device includes an elongated board of generally rectangular shape. The board is a molded construction of glass fibers and plastic. An elongated, longitudinally and downwardly extending track molded integrally with the central part of the bottom of the board fits in an annular groove around a roller on which the board is supported to pivot about a horizontal axis. A removable stop on the board permits the device to be adjusted to restrict the relative movement between the board and a roller to facilitate learning how to balance the board on the roller. In an alternate embodiment, the board includes a timing mechanism and display mounted on the board for tracking and displaying the elapsed time the user remains balanced on the board.

34 Claims, 10 Drawing Sheets

SAFETY BALANCE DEVICE

CLAIM OF PRIORITY

This invention claims the priority of U.S. Provisional Patent Application, Ser. No. 60/388,675, filed Jun. 13, 2002, the contents of which are hereby incorporated by reference.

FIELD OF THE INVENTION

This invention relates to balance devices used for exercising, recreation, and training to promote balance and reflex coordination skills, such as those required for snowboarding, wakeboarding, skimboarding, surfboarding, skateboarding and the like.

BACKGROUND

A number of balance devices have been disclosed in which the user stands on a board resting on a roller, and tries to keep the board balanced on the roller, which is on a supporting surface, such as a floor.

Examples of U.S. Patents which disclose balance devices of this type are:

| U.S. Pat. No. | Issue Date | Inventor |
| --- | --- | --- |
| 2,764,411 | Sep. 25, 1956 | S. Washburn, Jr. |
| 2,829,892 | Apr. 8, 1958 | F. G. Ludwig |
| 3,630,540 | Dec. 28, 1971 | William J. Smith |
| 4,505,477 | Mar. 19, 1985 | John M. Wilkinson |
| 4,601,469 | Jul. 22, 1986 | Martin Sasser, Jr. |
| 4,911,440 | Mar. 27, 1990 | Hyman, et al. |
| 5,152,691 | Oct. 6, 1992 | Bruce P. Moscarello |
| 5,190,506 | Mar. 2, 1993 | Zubik, et al. |

The prior art balance devices are of complex construction, and provide only one degree of difficulty in using the device. Thus, a beginner has difficulty in mastering the prior art devices, and is exposed to potentially dangerous accidents.

SUMMARY

This invention provides a balance device which includes a board molded in one piece from a durable plastic, preferably reinforced with long glass fibers. The molded board is more economical to make, and is substantially thinner than previous boards. The molded construction makes it possible to design boards with various degrees of flexibility, depending on the desire of the user. Moreover, the preferred board of this invention is safer and easier to learn to use because it can be adjusted to limit the relative movement between the board and the supporting roller. Thus, a beginner can learn quickly and safely how to balance the board on the roller, and be encouraged to progress rapidly in developing balancing skills. Thereafter, the board can be adjusted to permit maximum relative movement between the board and roller.

In brief, this invention provides an elongated board of generally rectangular shape. The board is a molded composition of long glass fibers and plastic. An elongated, longitudinally and downwardly extending track is molded integrally with the central part of the bottom surface of the board. A roller has an outwardly opening annular groove shaped to receive the track so the board can ride on the roller as a user stands on the board.

Preferably, a separate downwardly extending permanent block at each end of the track limits the maximum travel of the board relative to the roller. The permanent blocks are molded integrally with the bottom of the board and each respective end of the track. Each permanent block includes downwardly converging transverse surfaces to provide maximum strength and stability with minimum material and weight. Each permanent block extends sufficiently far from the bottom of the board to prevent an adjacent end of the board from engaging the surface which supports the roller.

The track preferably includes two longitudinally extending and laterally spaced rails molded integrally with the bottom of the board and at each end to a respective permanent block. In one form of the invention, a pair of transverse and longitudinally spaced removable stop pins fit through pairs of collinear bores extending through the track rails so the pins can be set at different longitudinally spaced positions to adjust the relative movement permitted between the board and the roller. In another form of the invention, relative movement between the roller and the board is controlled by a separate respective removable block fitted over each permanent block. The removable blocks in effect extend the effective length of the permanent blocks, thus limiting pivoting and the relative movement between the board and the roller. In either case, the removable pins or the removable blocks prevent the board from picking up excessive speed, and thereby promote safe and rapid learning by a beginner.

The roller preferably includes a spool of suitable hard material which is covered by a coating of softer, more elastic material, which can be varied to control the speed at which the board and roller move relative to each other. Thus, a beginner may use a roller which has a relatively soft cover. A more experienced user can safely operate the balancing device with a roller which has a harder or less elastic surface. In addition, the balancing device includes a mat which can be placed on the supporting surface to limit the speed of the roller to provide a safe arrangement for a beginner.

In an alternate embodiment, the board includes a timing mechanism and display mounted on the board for tracking and displaying the elapsed time the user remains balanced on the board.

DETAILED DESCRIPTION OF PREFERRED EMBODIMENTS

Figure 1:
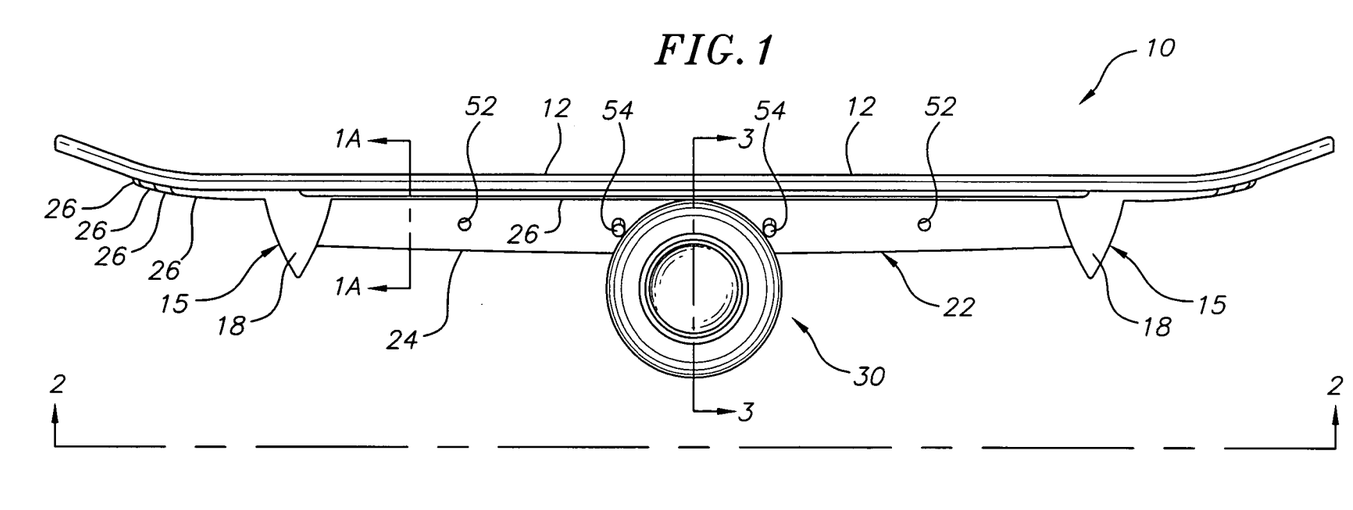
FIG. 1 is a side elevation of a preferred embodiment of the balancing device of this invention with transverse pins set to prevent all but a small movement of the board relative to the roller.
Figure 1A:
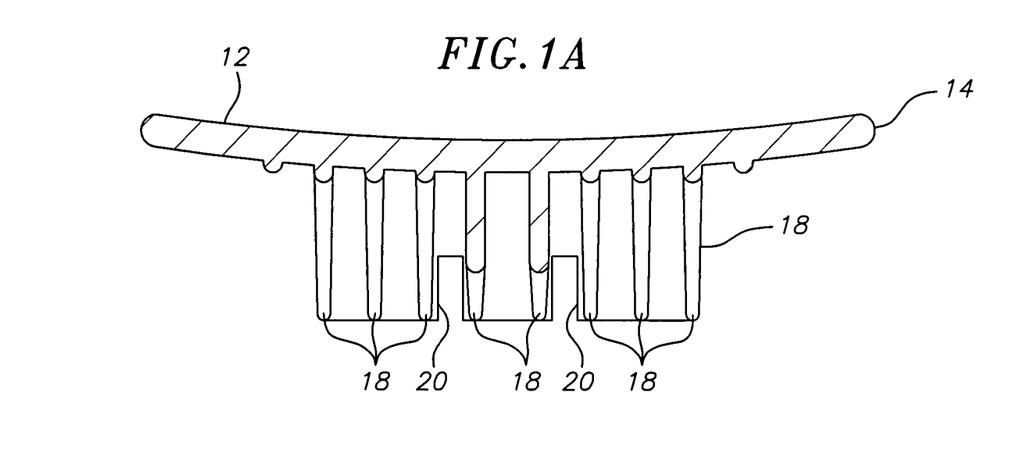
FIG. 1A is a view taken on line 1A-1A of FIG. 1.
Figure 2:
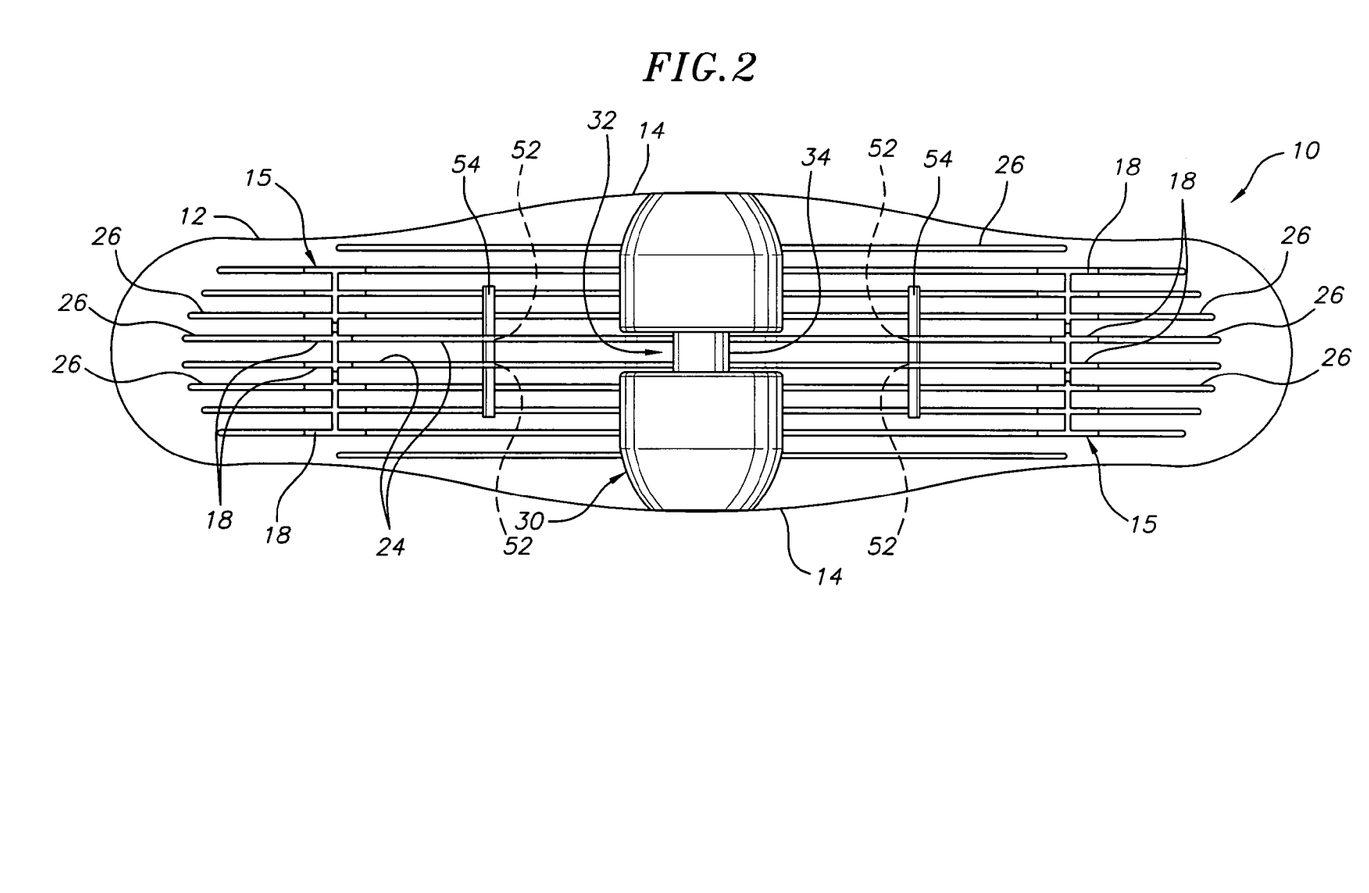
FIG. 2 is a view taken on line 2-2 of FIG. 1, showing the bottom of the balancing device of this invention.

Referring to FIGS. 1 and 2, a balancing device 10 of this invention includes an elongated, generally rectangular-shaped board 12, which is upturned at its ends, and slightly wider at a central portion 14 than at the ends. Preferably, the board is molded of a suitable durable plastic, such as polypropylene reinforced with long glass fibers. A separate downwardly extending and transverse permanent block 15 is molded integrally with the lower surface of the board. Each permanent block has longitudinally spaced and laterally extending surfaces which converge downwardly, when viewed from the side as in FIG. 1. Each permanent block is spaced inwardly from an adjacent end of the board by a distance equal to about one-fourth the length of the board. As shown best in FIG. 1A and FIG. 2, each permanent block includes a transverse web 16 perpendicular to the major plane of the board, and molded integrally at its upper edge to the bottom of the board. The lower edge of each web 16 is slightly rounded. Eight laterally spaced and longitudinally extending flanges 18 are molded at equally spaced intervals integral with each web 16 so that each flange extends in front of and behind the web to which it is attached. The outer and inner edges of each flange converge downwardly to give the permanent stop the wedge shape shown in FIG. 1. A pair of laterally spaced and downwardly opening rectangular notches 20 are formed in the lower edge of the web between respective pairs of adjacent flanges. The notches are equidistant from the longitudinal center line of the board, and serve a purpose described below.

A longitudinally extending track 22 is molded integrally with the underside of the board between the two permanent blocks 18. As shown best in FIGS. 1A and 2, the track includes a pair of laterally spaced rails 24 on opposite sides of the longitudinal center line of the board. The end of each rail abuts and is molded integrally with the lower portion of an inwardly extending part of a respective web 18 closest to the longitudinal center line of the board.

A plurality of laterally spaced, longitudinally and downwardly extending ribs 26 are molded integrally with the bottom of the board. As shown in FIG. 2, there are 10 equally spaced ribs 26 symmetrically positioned with respect to the longitudinal center line of the board. The ribs are of decreasing length in the outboard direction. The upper portion of each rail 24 is molded integrally with a respective innermost rib for that portion of the board inboard of the two centermost and inwardly extending flanges 18. The ribs and rails provide structural strength to the board with a minimum amount of weight. Moreover, the depth and length of the ribs and rails can be varied to achieve the desired flexibility and stiffness for the board.

Figure 3:
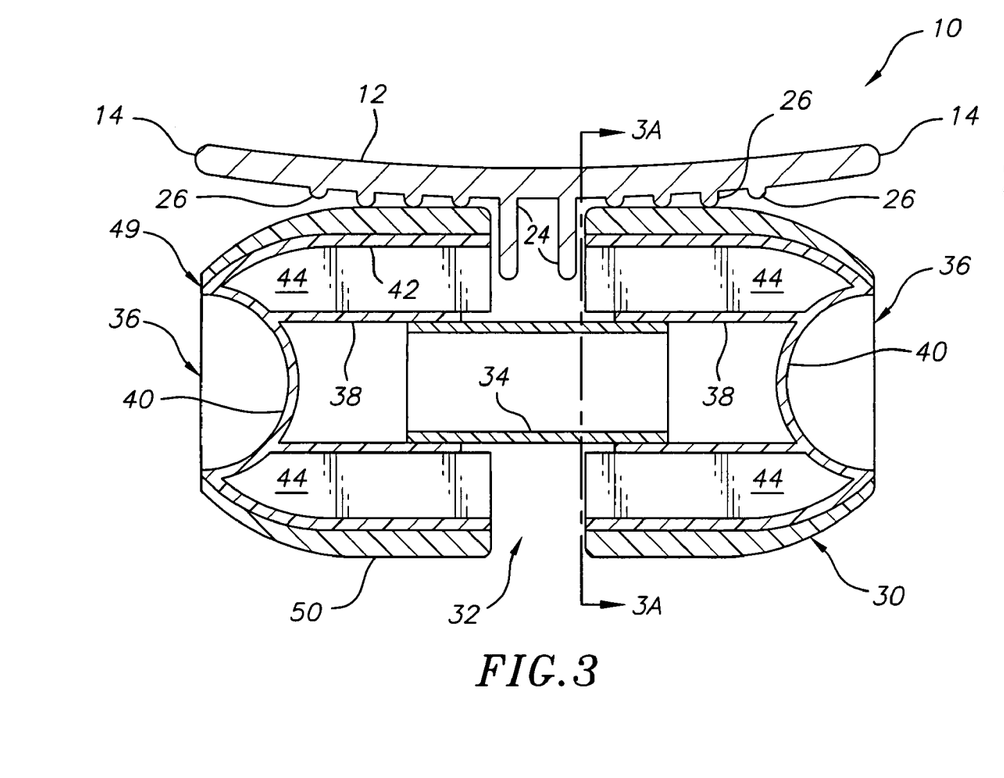
FIG. 3 is a view taken on line 3-3 of FIG. 1.
Figure 3A:
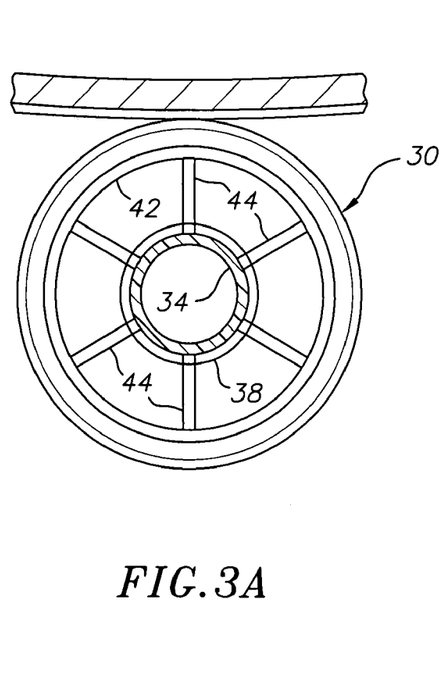
FIG. 3A is a view taken on line 3A-3A of FIG. 3.

Referring to FIGS. 3 and 3A, a roller 30 includes an outwardly opening annular groove 32 transposed around a transverse coupling tube 34. A pair of symmetrical caps 36 are each mounted on a respective end of the tubular coupling 34. Each cap 36 includes an inner transverse, cylindrical hub 38 bonded at its inner end over a respective outer end of the tubular coupling 34. The outer end of each inner hub 38 is molded integrally with a generally hemispherical and outwardly facing concave wall 40. A transverse outer hub 42 radially spaced from the inner hub 38 extends from a respective rail 24 outwardly and downwardly to the periphery of a respective wall 40 with which it is integrally molded. Six transverse stiffeners 44 spaced at equal intervals in the annular space between the inner and outer hubs 38, 42, respectively, extend radially between the hubs, and from their respective inner ends adjacent a rail 24 to respective outer ends, which are bonded to the inner surface of wall 40. The edge of each stiffener 44 adjacent the outer hub is bonded to the inner surface of that hub, and the opposite edge of each stiffener is bonded to the outer surface of the inner hub.

A separate cover 50 of elastomeric material, such as rubber or polyurethane, is bonded from the outer surface of each outer hub 42 so the outer hub is substantially completely covered. The coupling, hubs, walls and stiffeners of the rollers are made of a fairly hard and rigid plastic, such as nylon, to form a strong spool 49 covered at each end by the softer, more elastomeric cover 50.

As shown best in FIGS. 1, 2 and 3, when the board 12 is placed on the roller 30, the rails 24 of the track 22 fit into the outwardly opening annular groove 32 of the roller, and the ribs 26 on the bottom of the board ride on the elastomeric cover of the roller. This arrangement provides good gripping contact between the board and the roller to ensure precise tracking of the board with respect to the roller during the operation of the device.

Referring to FIGS. 1 and 2, each rail 24 has a set of four longitudinally spaced, transverse bores 52 so that a pair of transverse stop pins 54 can be inserted in collinear pairs of bores on opposite sides of the transverse center line of the board to limit the longitudinal movement of the board relative to the roller. As shown in FIG. 1, there are four bores 52 disposed symmetrically with respect to the center of each rail 24. The two bores closer to the center of each rail are located so that when the stop pins are inserted in them, the pins hold the roller substantially stationary to facilitate a beginning user developing confidence while learning to balance on the board. As the user acquires more skill, the pins can be moved to the outer positions to permit more, but still limited, longitudinal movement of the board relative to the roller. The pins can be omitted altogether for maximum use of the board. Preferably, each pin is steel and coated with rubber so that it makes a snug friction fit in a respective pair of co-linear bores 52.

Figure 4:
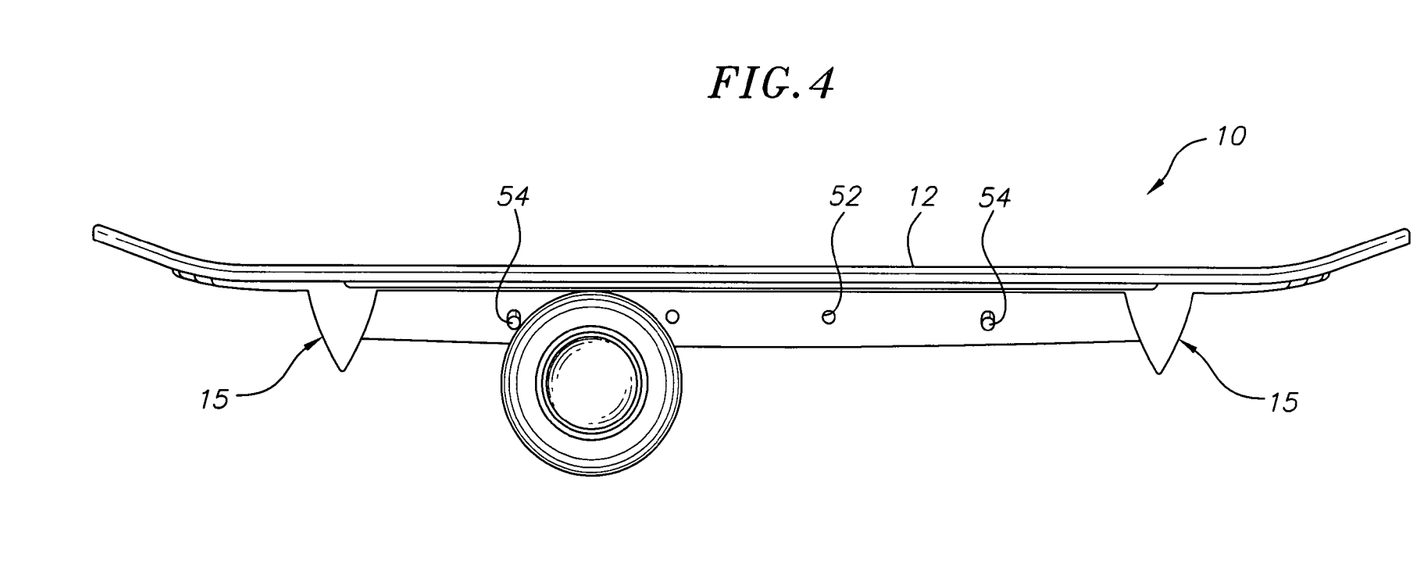
FIG. 4 is a view similar to FIG. 1 showing the transverse pins set to permit the board and roller to move a greater distance relative to each other than in FIG. 1.

By way of example, a typical board made in accordance with this invention has an overall length of about 32 inches, a maximum width at its center of about 9 inches, and a thickness of about ⅜ inch. The distance from the center of one permanent block 18 to the other is about 19 inches. The maximum distance between co-linear pairs of bores 52 is about 15 inches. FIG. 4 shows the limit of travel of the board longitudinally relative to the roller with the pins at the maximum spacing. The distance between the rails is about ¾ inch, and each pin is about 3 inches long.

Figure 5:
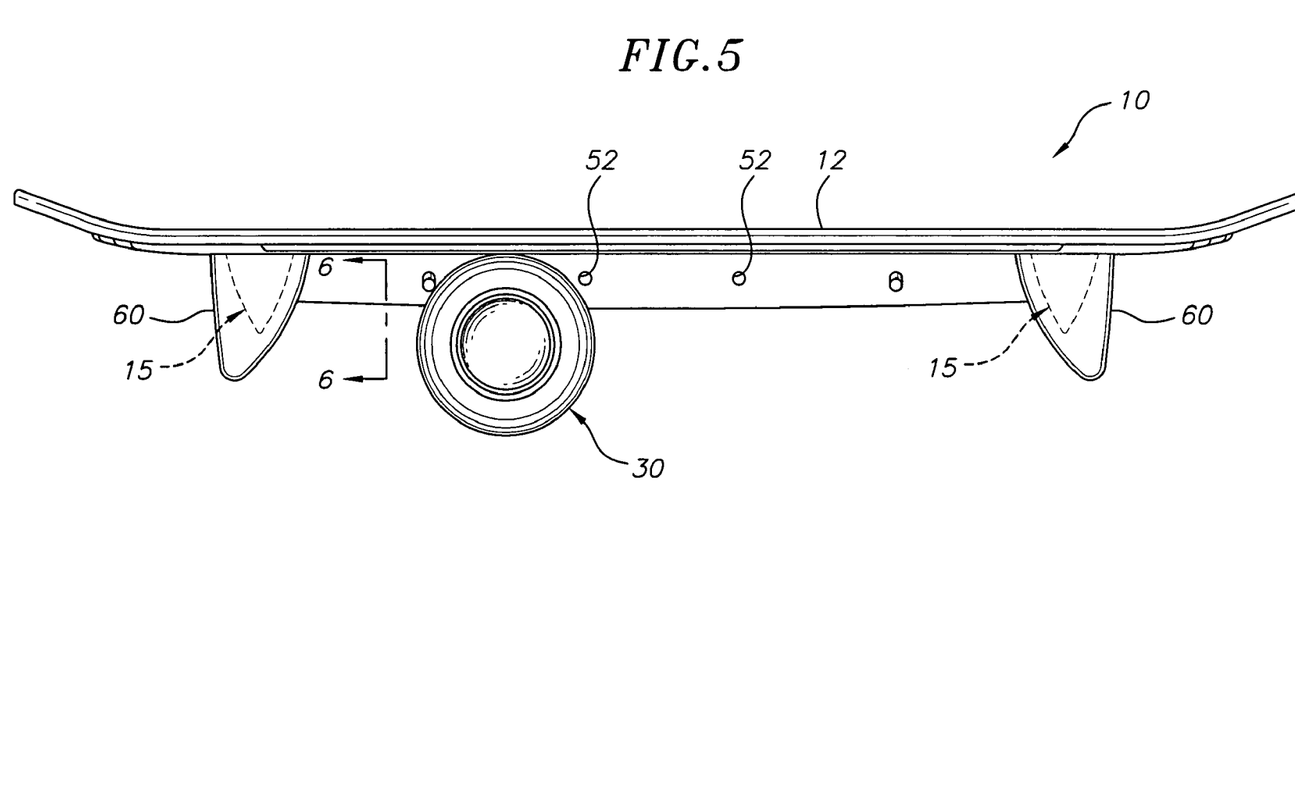
FIG. 5 is a view similar to that of FIG. 1, except a separate removable block is disposed over each permanent block adjacent each end of the board.
Figure 6:
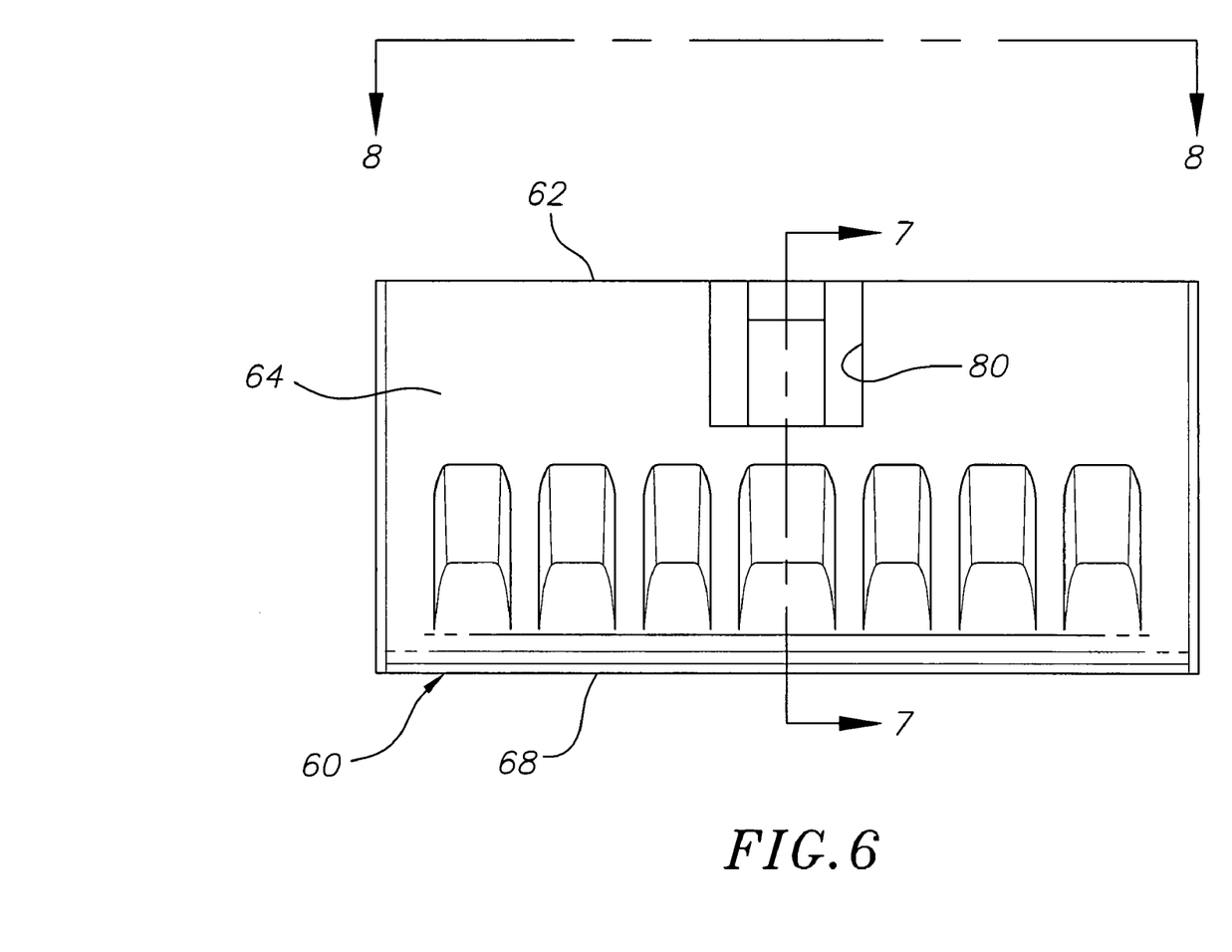
FIG. 6 is a view taken on line 6-6 of FIG. 5 showing in elevation the inside face of a removable block at the left (as viewed in FIG. 5) end of the board.

Referring to FIG. 5, a separate removable block 60 makes a snug friction fit over each permanent block 18 so that each removable block extends a substantial distance farther from the board than the permanent block. This limits the amount that the board can pivot with respect to the roller, and thereby limits the longitudinal movement of the board relative to the roller. The removable blocks can be used with the pins, as shown in FIG. 5, or with the pins removed. Referring to FIGS. 5-8, each removable block 60 includes an elongated body 62, which in transverse cross-section (FIG. 7) has downwardly converging inner and outer surfaces 64, 66, respectively, which terminate at their respective lower edges in a curved bottom 68.

Figure 7:
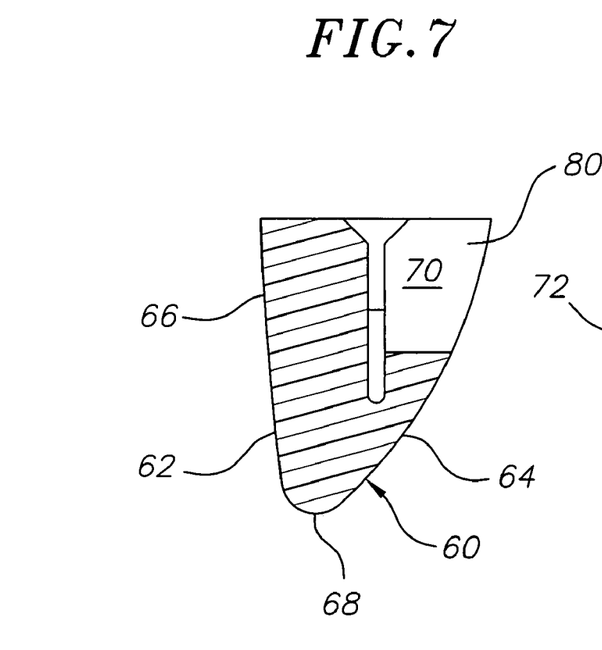
FIG. 7 is a view taken on line 7-7 of FIG. 6.
Figure 8:
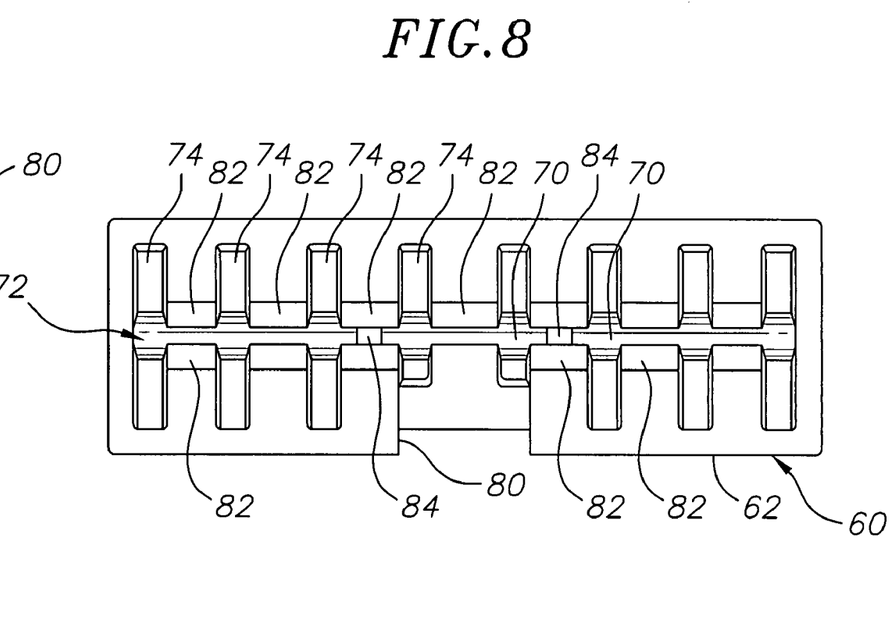
FIG. 8 is a view taken on line 8-8 of FIG. 6.

Referring to FIGS. 7 and 8, each removable block includes a cavity 70 which opens out of the top of the block, and is shaped to make a snug friction fit over a respective permanent block. Each cavity 70 includes elongated transverse portion 72, which extends from adjacent one end of the removable block to the other. Laterally spaced web cavities 74 open from the top and extend down into the removable block and are shaped to receive a respective web 18 on the permanent block 15 over which the removable block is fitted, as shown in FIG. 5. An inwardly and upwardly opening notch 80 in the center of the upper edge of the body 62 receives the track when the removable block is fitted in the position shown in FIG. 5.

The opposing upper edges of transverse portion 72 of the cavity 70 includes laterally spaced upwardly and outwardly diverging sections 82 to facilitate the fitting of a removable block on a permanent block. A pair of laterally spaced and longitudinally extending partitions 84 in the bottom of cavity 70 are positioned to fit snugly into slots 20 (FIG. 1A), when the removable block is fitted onto a permanent block, to enhance a strong and stable connection between the two blocks.

As indicated above, the removable blocks can be mounted as shown in FIG. 5 to reduce the angle through which the board can pivot relative to the roller, and thus provide a safe arrangement for a beginner to become confident, and make the board safer to use. After the user has acquired the desired degree of skill, the removable blocks can be taken off the permanent blocks to restore the device to a standard condition for maximum use.

If necessary, a mat (not shown) of a suitable soft material can be placed on the surface which supports the roller to provide a damping action for the roller and facilitate better control of the device by a beginner.

Figure 9:
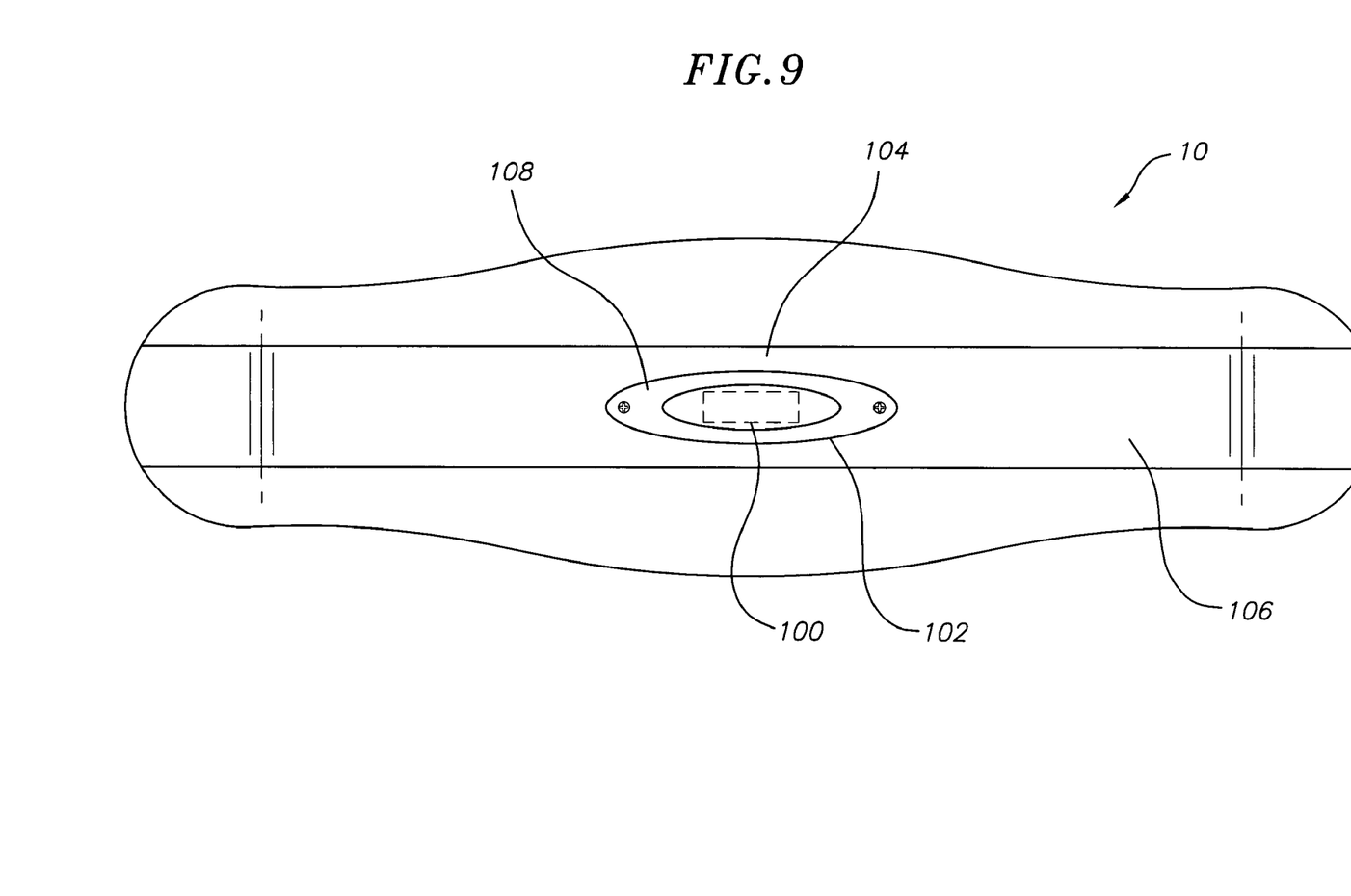
FIG. 9 is a top plan view of an alternate embodiment of the board that includes a timing mechanism and display.

Referring to FIG. 9, in an alternate embodiment of the present invention, the exemplary balancing device 10 includes a timing mechanism and display 100 for measuring the elapsed time the user remains balanced on the board, and for displaying the results to the user. In an exemplary embodiment, the timing mechanism and display 100 is disposed within a recess 102 proximate the center 104 of the top surface 106 of the board, and the surface 108 of the display is flush with the surface 104 of the board. When riding the board, the user can look down and see the elapsed time on the display.

Figure 10:
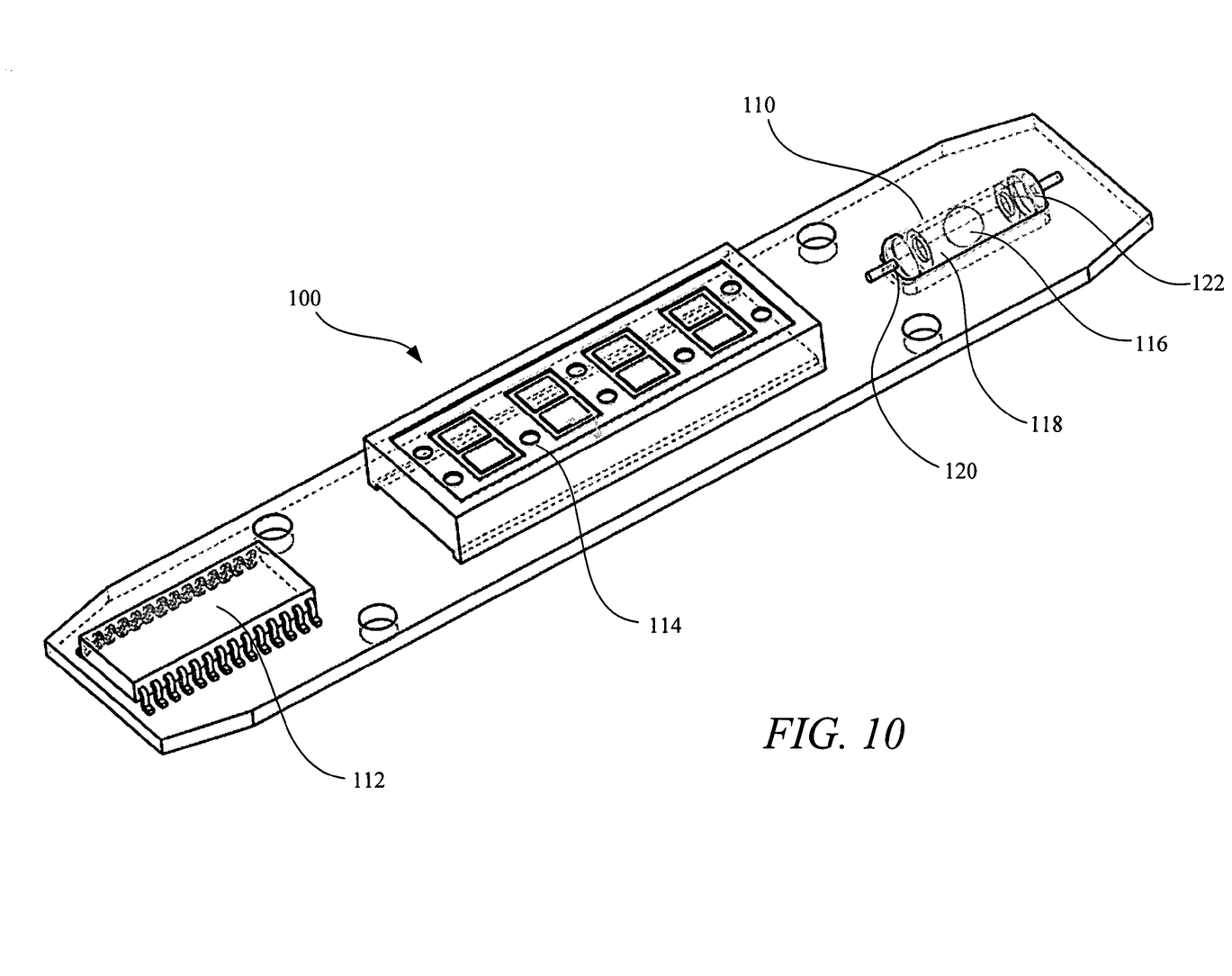
FIG. 10 is a perspective view, partly in cross-section of the timing mechanism and display of FIG. 9.
Figure 11:
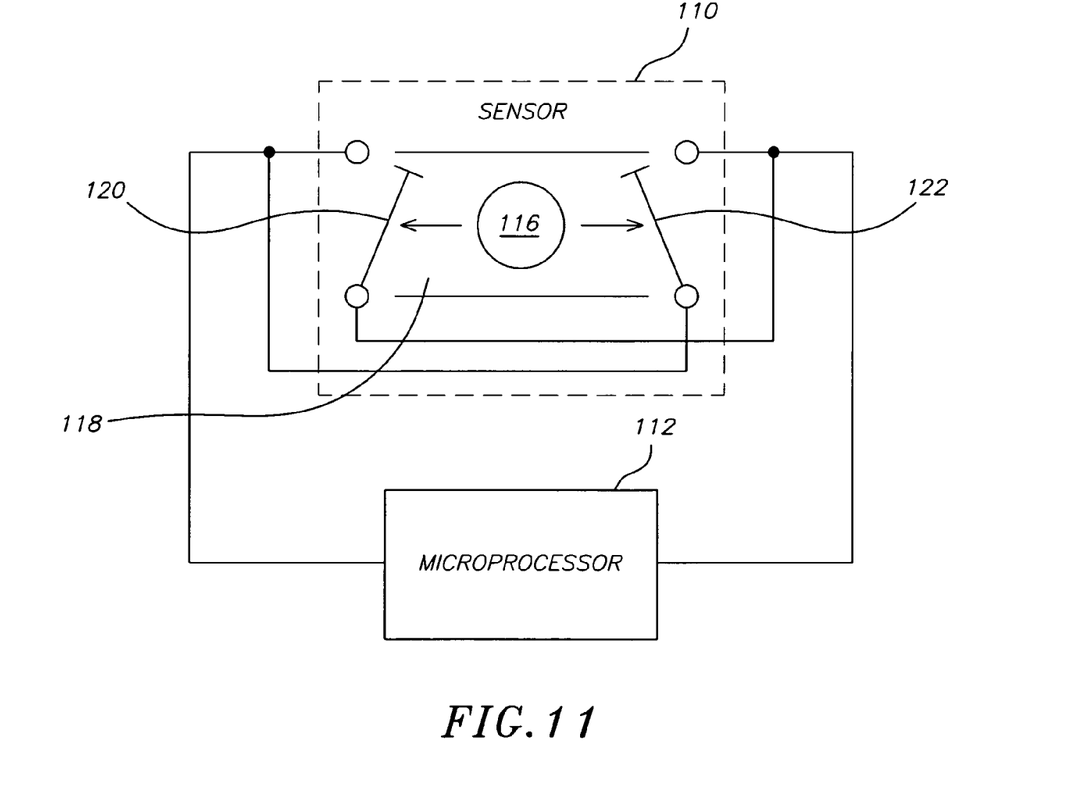
FIG. 11 is a block diagram of an exemplary automatic sensor and microprocessor circuit for implementing the timing mechanism and display of FIG. 9.

Referring to FIGS. 10 and 11, the timing mechanism and display 100 includes an automatic balance sensor 110, a microprocessor circuit 112 and a display screen 114. The sensor includes a metal ball 116 within a tube 118 having a pair of electrical connections 120, 122 located at the ends of the tube. In a tilted position, the ball makes contact with either pair of the connections, which closes the circuit and sets the microprocessor in standby mode. When the user begins balancing on the board, the ball moves away from contact, thereby triggering the microprocessor 112 to begin counting. As the user balances on the board, the ball rolls freely between both ends of the tube. When the user loses balance, the ball returns to an unbalanced position by making contact with the connections at either end of the tube, which then stops the timer. After a short delay, the display screen 114 flashes the elapsed time to the user as a measure of the performance.

In another alternate embodiment, the display includes illuminated lights and messages for motivating the user to continue balancing on the board, or for providing feedback regarding how well the user balanced on the board. In yet another alternate embodiment, information may be transmitted from the timing mechanism to a remote display, such as a display on a wristwatch, personal computer or handheld device. Sound or music may also be included to add another dimension of appeal for the user.

We claim:

1. A balancing device comprising:
   a) an elongated board, the board being made of a molded plastic, and having a top surface and a bottom surface;
   b) an elongated, longitudinally and downwardly extending track molded integrally with a central part of the bottom surface of the board; and
   c) a roller having an outwardly opening annular groove shaped to receive the track and support the board, wherein the board, track and groove are molded in one piece.

2. A balancing device according to claim 1 wherein the: elongated board is made of a molded composition of plastic and glass fibers.

3. A balancing device according to claim 1 which includes first and second permanent blocks molded integrally with the bottom surface of the board, each block being located at a respective end of the track.

4. A balancing device according to claim 3 in which the track includes a pair of laterally spaced rails.

5. A balancing device according to claim 3 in which each permanent block includes downwardly converging transverse surfaces.

6. A balancing device according to claim 3 which includes at least one removable block shaped to fit over a permanent block.

7. A balancing device according to claim 1 in which the board is wider in a central portion than at the ends of the board.

8. A balancing device according to claim 1 which includes longitudinally extending and laterally spaced guide ribs molded integrally with the bottom of the board.

9. A balancing device according to claim 1 in which the roller is a spool of a rigid material, and which is coated with an elastomeric material having a hardness less than that of the spool.

10. A balancing device according to claim 1 in which the track includes longitudinally spaced and transversely extending bores, and at least one stop pin shaped to make a snug fit within a bore to limit the longitudinal movement of the board relative to the roller.

11. A balancing device according to claim 10 which includes a first pin disposed through a first bore in the track, and a second pin disposed in a second bore longitudinally spaced from the first bore.

12. A balancing device according to claim 1, further comprising a timer and display for tracking and displaying elapsed time a user remains balanced on the board.

13. A balancing device comprising:
   a) an elongated board, the board having a top and a bottom;
   b) an elongated, longitudinally and downwardly extending track secured to a central part of the bottom of the board;
   c) a roller, not secured to the track, having an outwardly opening annular groove shaped to receive the track and support the board when the roller is on a supporting surface so the board can pivot on the roller and move longitudinally relative to the roller; and
   d) a removable stop secured to the device to limit the longitudinal movement of the board relative to the roller.

14. A balancing device according to claim 13 in which the removable stop is at least one transverse pin fitted in a transverse bore in the track.

15. A balancing device according to claim 13 in which the stop is a pair of pins mounted in longitudinally spaced transverse bores in the track.

16. A balancing device according to claim 13 which includes a pair of longitudinally spaced permanent blocks secured to the bottom of the board, and separate removable blocks each shaped to fit over a respective permanent block.

17. A balancing device according to claim 13, further comprising a timer and display for tracking elapsed time the user remains on the board and displaying the elapsed time.

18. A balancing device according to claim 17, wherein the timer and display are disposed within a recess proximate center of the top of the board.

19. A balancing device comprising:
   an elongated board, the board having a top surface and a bottom surface;
   a roller adapted to support the board so the board can pivot on the roller and move relative to the roller between a first position and a second position;
   a timer and display disposed within a recess on the top surface of the board for measuring elapsed time a user balances on the board, and a display for displaying the elapsed time to the user.

20. A balancing device according to claim 19, wherein the timer includes a sensor for determining when the user is balancing on the board.

21. A balancing device according to claim 19, wherein the display includes illuminating lights.

22. A balancing device according to claim 19, wherein the display includes messages for motivating a user.

23. A balancing device according to claim 19, wherein the display further comprises sound or music.

24. A balancing device comprising:
   a) an elongated board, the board being made of a molded plastic, and having a top surface and a bottom surface;
   b) an elongated, longitudinally and downwardly extending track molded integrally with a central part of the bottom surface of the board;
   c) a roller having an outwardly opening annular groove shaped to receive the track and support the board;
   d) first and second permanent blocks molded integrally with the bottom surface of the board, each block being located at a respective end of the track; and
   e) at least one removable block shaped to fit over a permanent block.

25. A balancing device according to claim 24 in which the board is wider in a central portion than at the ends of the board.

26. A balancing device according to claim 24 which includes longitudinally extending and laterally spaced guide ribs molded integrally with the bottom of the board.

27. A balancing device according to claim 24 in which the roller is a spool of a rigid material, and which is coated with an elastomeric material having a hardness less than that of the spool.

28. A balancing device according to claim 24 in which the track includes longitudinally spaced and transversely extending bores, and at least one stop pin shaped to make a snug fit within a bore to limit the longitudinal movement of the board relative to the roller.

29. A balancing device according to claim 28 which includes a first pin disposed through a first bore in the track, and a second pin disposed in a second bore longitudinally spaced from the first bore.

30. A balancing device according to claim 24, further comprising a timer and display for tracking and displaying elapsed time a user remains balanced on the board.

31. A balancing device according to claim 30, wherein the timer includes a sensor for determining when the user is balancing on the board.

32. A balancing device according to claim 30, wherein the display includes illuminating lights.

33. A balancing device according to claim 30, wherein the display includes messages for motivating a user.

34. A balancing device according to claim 30, wherein the display further comprises sound or music.

* * * * *